United States Patent
Sato et al.

(10) Patent No.: US 9,203,481 B2
(45) Date of Patent: Dec. 1, 2015

(54) RADIO BASE STATION AND COMMUNICATION CONTROL METHOD INCLUDING A REQUEST TO STOP TRANSMISSION OF A REFERENCE SIGNAL AT A PREDETERMINED TIMING

(75) Inventors: Yoshizo Sato, Yawata (JP); Masaaki Nakata, Yamato (JP); Nobuaki Takamatsu, Koto-ku (JP); Masahiro Yagi, Kawasaki (JP); Hiroki Fujita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 100 days.

(21) Appl. No.: 13/819,658

(22) PCT Filed: Aug. 26, 2011

(86) PCT No.: PCT/JP2011/069356
§ 371 (c)(1),
(2), (4) Date: Mar. 28, 2013

(87) PCT Pub. No.: WO2012/026602
PCT Pub. Date: Mar. 1, 2012

(65) Prior Publication Data
US 2013/0273973 A1 Oct. 17, 2013

(30) Foreign Application Priority Data
Aug. 27, 2010 (JP) .................................. 2010-191354

(51) Int. Cl.
*H04B 7/04* (2006.01)
*H04B 7/06* (2006.01)
*H04L 5/00* (2006.01)
*H04W 16/28* (2009.01)

(52) U.S. Cl.
CPC ................ *H04B 7/04* (2013.01); *H04B 7/0615* (2013.01); *H04L 5/0048* (2013.01); *H04W 16/28* (2013.01)

(58) Field of Classification Search
None
See application file for complete search history.

(56) References Cited

U.S. PATENT DOCUMENTS

| | | | |
|---|---|---|---|
| 2009/0042615 A1 | 2/2009 | Teo et al. | |
| 2009/0042616 A1* | 2/2009 | Teo et al. | 455/562.1 |
| 2011/0032888 A1 | 2/2011 | Matsumoto et al. | |
| 2011/0081929 A1 | 4/2011 | Matsumoto et al. | |
| 2011/0188549 A1* | 8/2011 | Wan et al. | 375/213 |
| 2011/0305212 A1 | 12/2011 | Miyatake et al. | |
| 2012/0106471 A1* | 5/2012 | Behravan et al. | 370/329 |
| 2012/0147847 A1 | 6/2012 | Matsumoto et al. | |
| 2013/0039329 A1 | 2/2013 | Matsumoto et al. | |
| 2013/0194908 A1* | 8/2013 | Gao et al. | 370/203 |

FOREIGN PATENT DOCUMENTS

| | | |
|---|---|---|
| JP | 2008-211686 A | 9/2008 |
| JP | 2009-060596 A | 3/2009 |

(Continued)

OTHER PUBLICATIONS

International Search Report; PCT/JP2011/069356; Sep. 27, 2011.

(Continued)

*Primary Examiner* — Alejandro Rivero
(74) *Attorney, Agent, or Firm* — Studebaker & Brackett PC

(57) ABSTRACT

If the frequency band of an SRS from a serving radio terminal (UE 2-1) is identical with the frequency band of an SRS from a serving radio terminal (UE 2-2), a radio base station (eNB 1-1) transmits, to one of the serving radio terminals (UE 2-1, UE 2-2), an RRC connection reconfiguration message in which transmission halt request information has been set.

8 Claims, 6 Drawing Sheets

(56) References Cited

FOREIGN PATENT DOCUMENTS

WO 2009/022474 A1 2/2009
WO 2010/061768 A1 6/2010

OTHER PUBLICATIONS

3GPP TS 36.211 8.7.0 (May 2009); 3rd Generation Partnership Project; Technical Specification Group Radio Access Network; Evolved Universal Terrestrial Radio Access (E-UTRA); Physical Channels and Modulation (Release 8).

An Office Action; "Notice of Reason for Rejection," issued by the Japanese Patent Office on Feb. 4, 2014, which corresponds to Japanese Patent Application No. 2012-530748 and is related to U.S. Appl. No. 13/819,658; with English language statement of relevance.

* cited by examiner

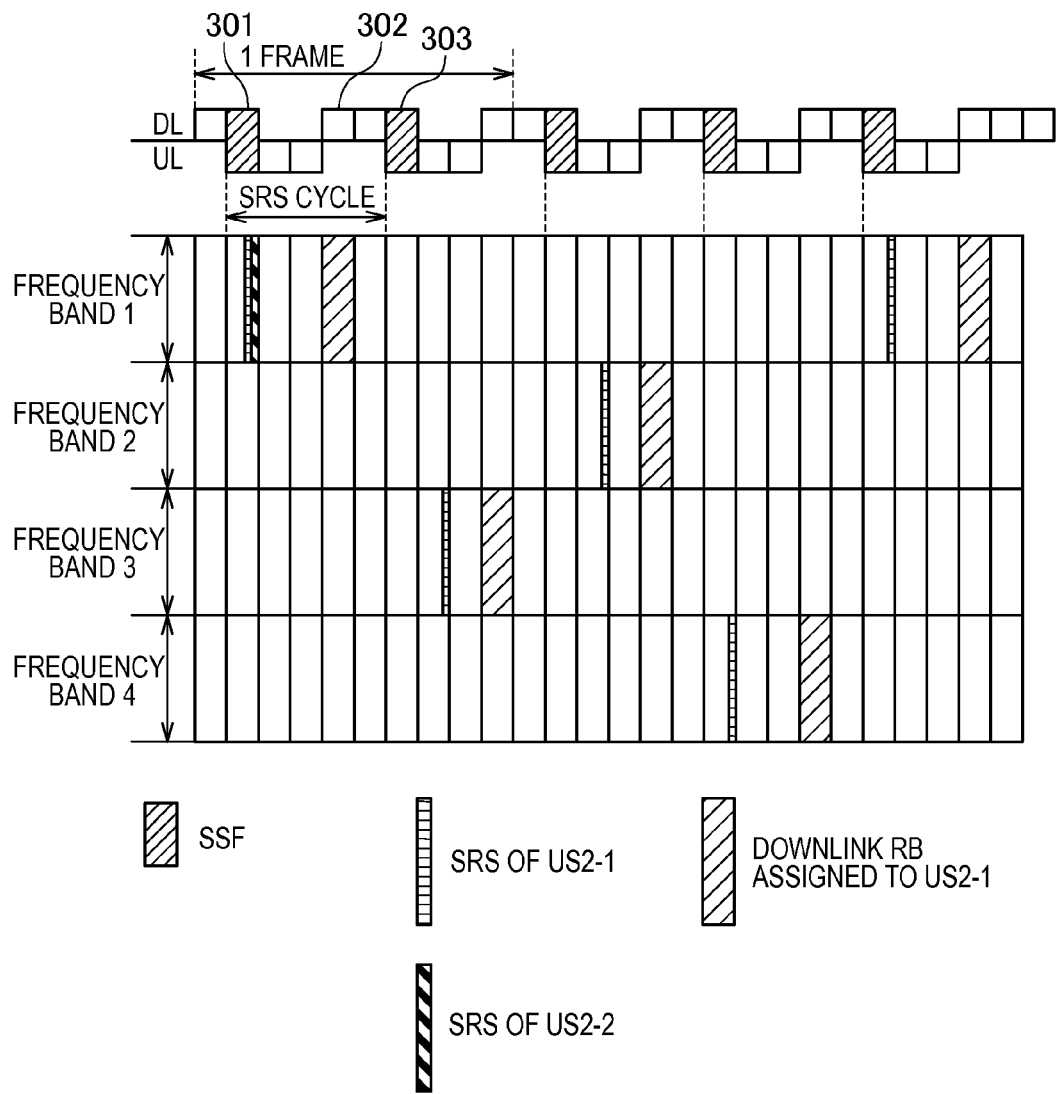

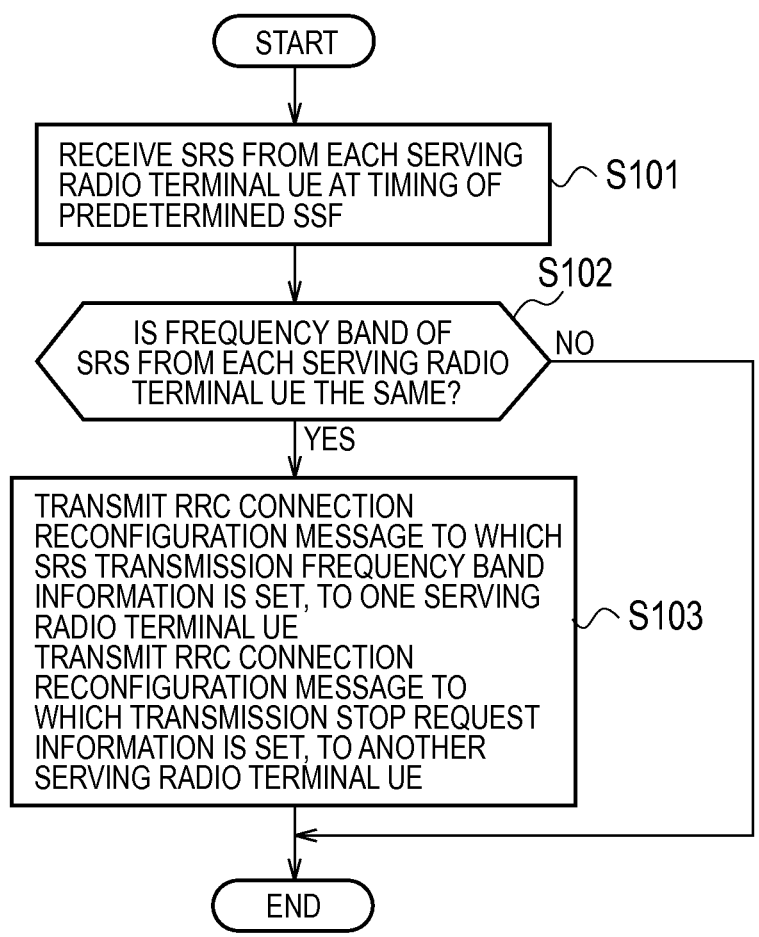

RADIO BASE STATION AND COMMUNICATION CONTROL METHOD INCLUDING A REQUEST TO STOP TRANSMISSION OF A REFERENCE SIGNAL AT A PREDETERMINED TIMING

TECHNICAL FIELD

The present invention relates to a radio base station of an adaptive array radio scheme in which an antenna weight is applied to a plurality of antennas, and a communication control method in such a radio base station.

BACKGROUND ART

In 3GPP (Third Generation Partnership Project), in a radio communication system corresponding to LTE (Long term Evolution), for which the standards are being set up currently, a radio base station eNB assigns a radio resource in the radio communication between the radio base station eNB and a radio terminal UE (for example, see Non Patent Literature 1). Furthermore, in a radio communication system corresponding to LTE, either Frequency Division Duplex (FDD) or Time Division Duplex (TDD) is employed in the radio communication between the radio base station eNB and the radio terminal UE.

Moreover, in an LTE radio communication system employing TDD (TDD-LTE), each of the adjacent radio base stations eNB uses the same frequency band in the radio communication with a subordinate radio terminal UE. Therefore, null steering is being examined, which is a technique according to which at the time of calculating an antenna weight for a downlink radio resource block assigned to a subordinate radio terminal UE, a first radio base station eNB directs the null in the direction of a radio terminal UE subordinate to a second radio base station eNB, in order to control interference. When the first radio base station eNB performs null steering, the effect of controlling interference in the radio communication between the second radio base station eNB and the subordinate radio terminal UE is obtained. In null steering, when the first radio base station eNB receives a sounding reference signal (SRS), which is an uplink radio signal transmitted by a radio terminal UE subordinate to the second radio base station eNB, the direction of arrival of the SRS is recognized as the direction of the radio terminal UE subordinate to the second radio base station eNB. Moreover, the antenna weight is calculated such that the first radio base station eNB directs the null in the direction of the radio terminal UE subordinate to the second radio base station eNB.

When a plurality of radio terminals UE subordinate to the second radio base station eNB simultaneously transmit SRS of the same frequency band, the first radio base station eNB simultaneously receives the SRS arriving from different directions from each of the plurality of radio terminals UE subordinate to the second radio base station eNB. Therefore, it is not possible for the first radio base station eNB to determine the direction of turning the null, which makes it difficult to perform accurate null steering.

CITATION LIST

Non Patent Literature

[Non Patent Literature 1] 3GPP TS 36.211 V8.7.0 "Physical Channels and Modulation", May 2009

SUMMARY OF INVENTION

A first feature of the present invention is summarized as a radio base station (radio base station eNB 1-1) of an adaptive array radio scheme applying an antenna weight to a plurality of antennas (antenna 108A, antenna 108B, antenna 108C, antenna 108D), comprising: a transmission unit (control unit 102, radio communication unit 106, modulation and demodulation unit 107, antenna 108A, antenna 108B, antenna 108C, antenna 108D) that transmits reference signal transmission frequency band control information, to a serving radio terminal (serving radio terminal UE 2-1, serving radio terminal UE2-2), for controlling a reference signal transmission frequency band available in the transmission of a reference signal (SRS) from the serving radio terminal, the reference signal being referenced in the calculation of the antenna weight, wherein in case that one serving radio terminal included in a plurality of serving radio terminals transmits a reference signal of a first reference signal transmission frequency band at a predetermined timing, the transmission unit transmits transmission stop request information (SRS transmission stop request information) indicating a request to stop the transmission of the reference signal of the first reference signal transmission frequency band at the predetermined timing, to another serving radio terminal.

The radio base station described above requests the serving radio terminals other than the one serving radio terminal to stop the transmission of the reference signal of the first reference signal transmission frequency band at the predetermined timing, in case that one serving radio terminal transmits the reference signal of the first reference signal transmission frequency band at the predetermined timing. Therefore, the simultaneous transmission of reference signals of the same frequency band by a plurality of serving radio terminals is prevented. Thus, another radio base station can perform appropriate null steering by determining the direction of placing null at the time of calculating the antenna weight for a downlink radio resource used in the radio communication with a serving radio terminal subordinate to the other radio base station.

A second feature of the present invention is summarized as that the transmission unit transmits the transmission stop request information to a serving radio terminal other than one serving radio terminal having the highest priority order of assignment of a radio resource, from among a plurality of serving radio terminals.

A second feature of the present invention is summarized as that the transmission unit transmits the transmission stop request information to a serving radio terminal for which the assignment of a radio resource is not necessary, from among a plurality of serving radio terminals.

A fourth feature of the present invention is summarized as a communication control method in a radio base station of an adaptive array radio scheme applying an antenna weight to a plurality of antennas, comprising: a step of transmitting reference signal transmission frequency band control information, to a serving radio terminal, for controlling a reference signal transmission frequency band available in the transmission of a reference signal from the serving radio terminal, the reference signal being referenced in the calculation of the antenna weight, wherein in case that one serving radio terminal included in a plurality of serving radio terminals transmits a reference signal of a first reference signal transmission frequency band at a predetermined timing, the step of transmitting includes a step of transmitting transmission stop request information indicating a request to stop the transmission of the reference signal of the first reference signal transmission frequency band at the predetermined timing, to another serving radio terminal.

BRIEF DESCRIPTION OF DRAWINGS

FIG. 6 is a diagram illustrating an example of the correspondence between a frequency band of SRS and an assigned downlink RB according to the embodiment of the present invention.

FIG. 7 is a flowchart illustrating an operation of the radio base station according to the embodiment of the present invention.

DESCRIPTION OF EMBODIMENTS

Figure 1:
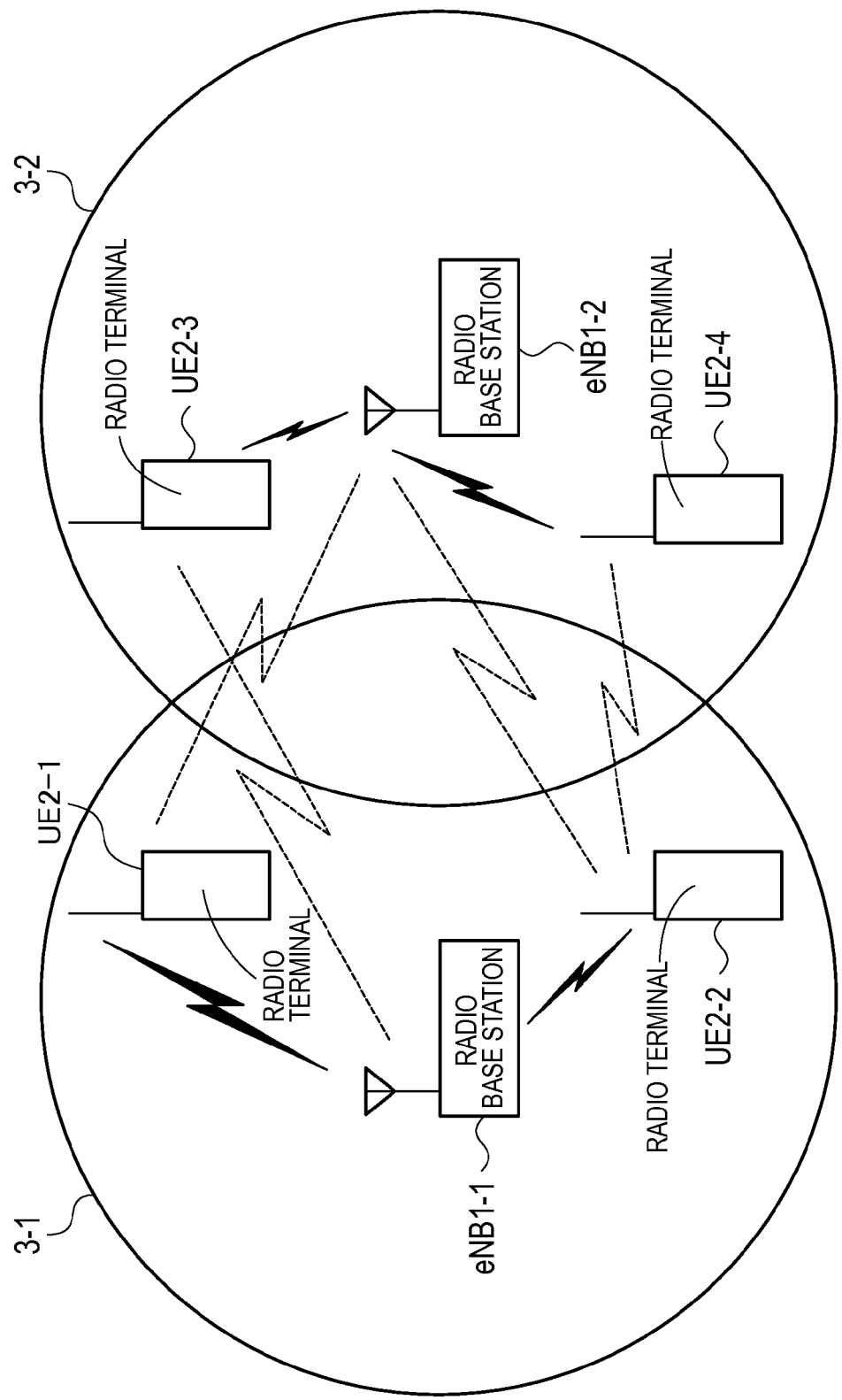
FIG. 1 is a diagram illustrating the entire schematic configuration of a radio communication system according to an embodiment of the present invention.

Next, an embodiment of the present invention will be described with reference to the drawings. Specifically, (1) Configuration of radio communication system, (2) Configuration of radio base station, (3) Operation of radio base station, (4) Operation and effect, and (5) Other embodiments will be described. It is to be noted that the same or similar reference numerals are applied to the same or similar parts through the drawings in the following embodiments.

(1) Configuration of Radio Communication System

FIG. 1 is a diagram illustrating the entire schematic configuration of a radio communication system 10 according to the embodiment of the present invention.

The radio communication system 10 illustrated in FIG. 1 is a TDD-LTE radio communication system. The radio communication system 10 includes an adjacent radio base station eNB1-1 and a radio base station eNB1-2, a radio terminal UE2-1, a radio terminal UE2-2, a radio terminal UE2-3, and a radio terminal UE2-4.

As illustrated in FIG. 1, the radio base station eNB1-1 and the radio base station eNB1-2 constitute E-UTRAN (Evolved-UMTS Terrestrial Radio Access Network). The radio terminal UE2-1 and the radio terminal UE2-2 exist in a cell 3-1 that is a communication available area provided by the radio base station eNB1-1. The radio terminal UE2-3 and the radio terminal UE2-4 exist in a cell 3-2 that is a communication available area provided by the radio base station eNB1-2.

The radio terminal UE2-1 and the radio terminal UE2-2 are terminals to which a resource block is assigned by the radio base station eNB1-1. The radio terminal UE2-3 and the radio terminal UE2-4 are terminals to which a resource block is assigned by the radio base station eNB1-2. In this case, when the radio base station eNB1-1 is set as a reference, the radio terminal UE2-1 and the radio terminal UE2-2 are serving radio terminals, and the radio terminal UE2-3 and the radio terminal UE2-4 are non-serving radio terminals. Furthermore, when the radio base station eNB1-2 is set as a reference, the radio terminal UE2-3 and the radio terminal UE2-4 are serving radio terminals, and the radio terminal UE2-1 and the radio terminal UE2-2 are non-serving radio terminals.

While Time Division Duplex is employed in the radio communication between the radio base station eNB1-1 and the radio terminals UE2-1 and UE2-2, OFDMA (Orthogonal Frequency Division Multiplexing Access) is employed in the downlink radio communication, and SC-FDMA (Single Carrier Frequency Division Multiple Access) is employed in the uplink radio communication. Similarly, while Time Division Duplex is employed in the radio communication between the radio base station eNB1-2 and the radio terminals UE2-3 and UE2-4, OFDMA is employed in the downlink radio communication, and SC-FDMA is employed in the uplink radio communication. Furthermore, downlink indicates a direction from the radio base station eNB1-1 to the radio terminal UE2-1 and the radio terminal UE2-2, and a direction from the radio base station eNB1-2 to the radio terminal UE2-3 and the radio terminal UE2-4. Uplink indicates a direction from the radio terminal UE2-1 and the radio terminal UE2-2 to the radio base station eNB1-1, and a direction from the radio terminal UE2-3 and the radio terminal UE2-4 to the radio base station eNB1-2.

The radio base station eNB1-1 assigns a resource block (RB) as a radio resource to the radio terminal UE2-1 and the radio terminal UE2-2 in the cell 3-1. Similarly, the radio base station eNB1-2 assigns a resource block to the radio terminal UE2-3 and the radio terminal UE2-4 in the cell 3-2.

The resource block includes a downlink resource block (downlink RB) to be used in the downlink radio communication and an uplink resource block (uplink RB) to be used in the uplink radio communication. A plurality of downlink resource blocks are arranged in the frequency direction and the time direction. Similarly, a plurality of uplink resource blocks are arranged in the frequency direction and the time direction.

Figure 2:
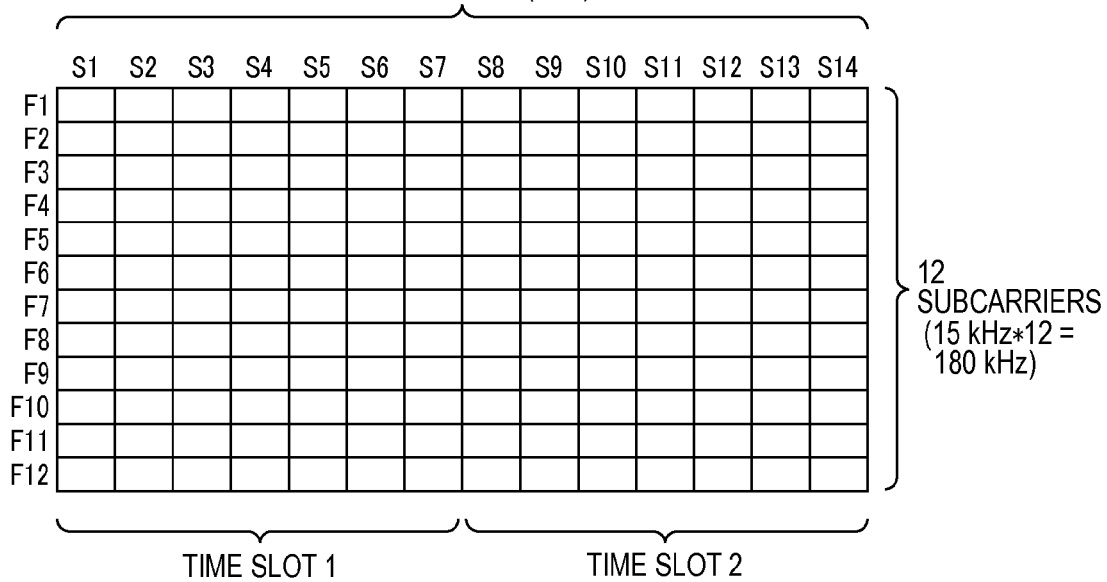
FIG. 2 is a diagram illustrating a format of a resource block according to the embodiment of the present invention.

FIG. 2 is a diagram illustrating a format of the resource block. The resource block is configured in one subframe having a time length of 1 [ms] in the time direction. The subframe includes a time period 51 to a time period S14. Among the time period 51 to the time period S14, the time period 51 to the time period S7 constitute a first half time slot (a time slot 1) and the time period S8 to the time period S14 constitute a latter half time slot (a time slot 2). Also, the time slot 1 and the time slot 2 correspond to the resource block.

As illustrated in FIG. 2, the resource block has a frequency width of 180 [kHz] in the frequency direction. Furthermore, the resource block includes 12 subcarriers F1 to F12 having a frequency width of 15 [kHz].

Figure 3:
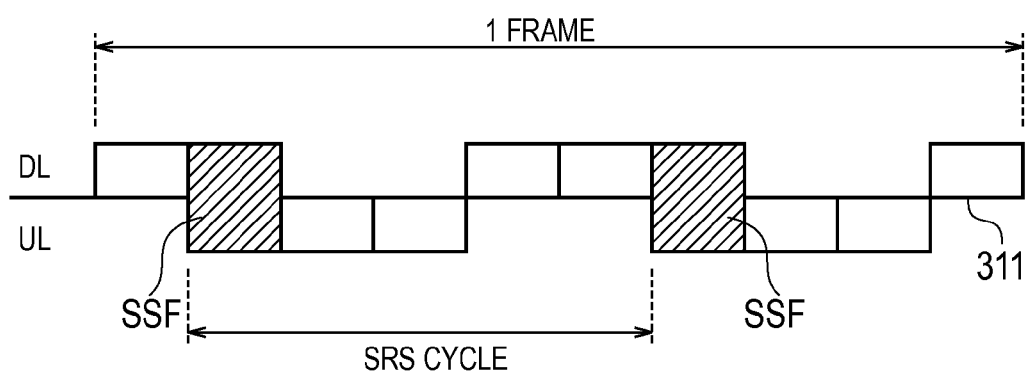
FIG. 3 is a diagram illustrating a format of a frame according to the embodiment of the present invention.

Furthermore, in the time direction, a plurality of subframes constitute one frame. FIG. 3 is a diagram illustrating a format of the frame. The frame illustrated in FIG. 3 includes 10 subframes. The frame includes 10 subframes in the sequence of a subframe of a downlink resource block, subframes (special subframes: SSF) of both the downlink resource block and an uplink resource block, a subframe of the uplink resource block, a subframe of the uplink resource block, a subframe of the downlink resource block, a subframe of the downlink resource block, a special subframe, a subframe of the uplink resource block, a subframe of the uplink resource block, and a subframe of the downlink resource block. In the special subframe, within the subframe, the first half of the time slot is used for downlink radio communication and the latter half of the time slot is used for uplink radio communication across a guard time.

Furthermore, in the frequency direction, the entire frequency band of the radio resource available in the radio communication between the radio base station eNB and the radio terminal UE, in other words, the frequency band that can be assigned to the serving radio terminal UE (assigned frequency band), has a bandwidth corresponding to the number of a plurality of resource blocks.

Figure 4:
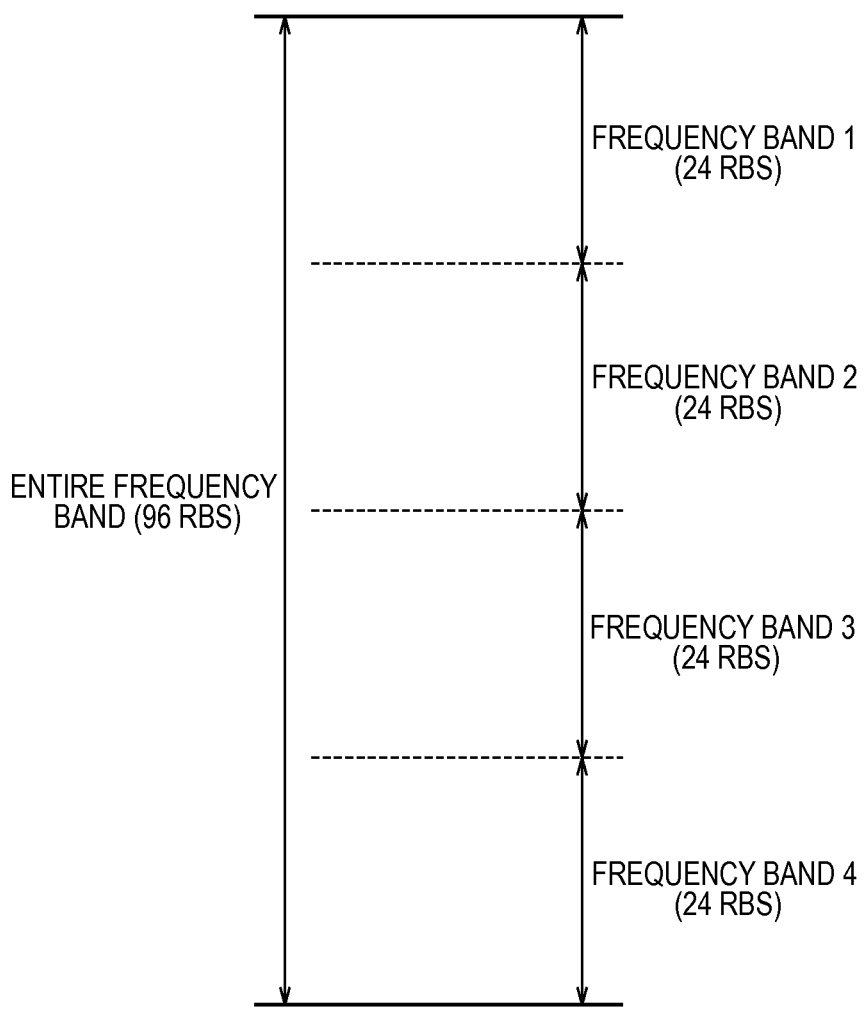
FIG. 4 is a diagram illustrating a configuration of a frequency band of a radio resource available in radio communication between a radio base station and a radio terminal according to the embodiment of the present invention.

FIG. 4 is a diagram illustrating a configuration of the entire frequency band of a radio resource available in the radio communication between the radio base station eNB and the radio terminal UE. As illustrated in FIG. 4, the entire frequency band of the radio resource available in the radio communication between the radio base station eNB and the radio terminal UE has a bandwidth corresponding to 96 resource blocks. Furthermore, the entire frequency band is divided into a frequency band 1 to a frequency band 4, each of which has a bandwidth corresponding to 24 resource blocks.

The downlink resource block is configured by a control information channel (PDCCH: Physical Downlink Control CHannel) for downlink control information transmission and a shared data channel (PDSCH: Physical Downlink Shared CHannel) for downlink user data transmission, in the time direction.

On the other hand, in the uplink resource block, a control information channel (PUCCH: Physical Uplink Control CHannel) for uplink control information transmission is configured at both ends of the entire frequency band available in the uplink radio communication, and a shared data channel (PUSCH: Physical Uplink Shared CHannel) for uplink user data transmission is configured in the central part.

(2) Configuration of Radio Base Station

Figure 5:
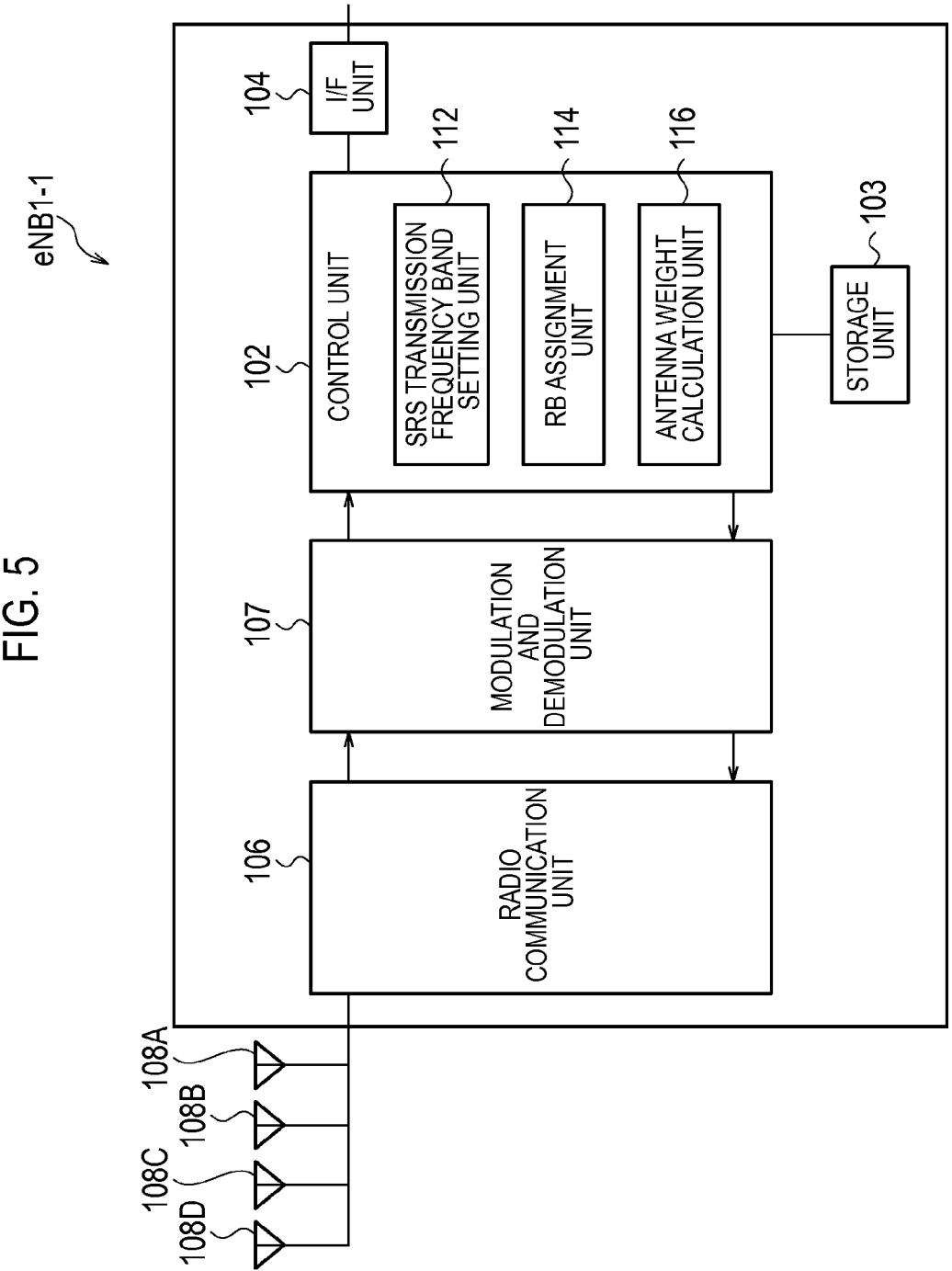
FIG. 5 is a configuration diagram of a radio base station according to the embodiment of the present invention.

FIG. 5 is a configuration diagram of the radio base station eNB1-1. In addition, the radio base station eNB1-2 also has the same configuration as that of the radio base station eNB1-1. As illustrated in FIG. 5, the radio base station eNB1-1 is a radio base station of an adaptive array radio scheme in which an antenna weight is applied to a plurality of antennas, and includes a control unit 102, a storage unit 103, an I/F unit 104, a radio communication unit 106, a modulation and demodulation unit 107, an antenna 108A, an antenna 108B, an antenna 108C, and an antenna 108D.

The control unit 102, for example, is configured by a CPU, and controls various functions of the radio base station eNB1-1. The control unit 102 includes a sounding reference signal (SRS) transmission frequency band setting unit 112, a resource block (RB) assignment unit 114, and an antenna weight calculation unit 116. The storage unit 103, for example, is configured by a memory, and stores various types of information used for the control and the like of the radio base station eNB1-1.

The I/F unit 104 is able to communicate with another radio base station eNB through an X2 interface. Furthermore, the I/F unit 104 is able to communicate with EPC (Evolved Packet Core) that is not illustrated in the diagram, more specifically, with MME (Mobility Management Entity)/S-GW (Serving Gateway) through an S1 interface.

The radio communication unit 106 receives an uplink radio signal transmitted from the radio terminal UE2-1 and the radio terminal UE2-2, which are the serving radio terminals UE, through the antenna 108A to the antenna 108D. Moreover, the radio communication unit 106 converts (down-converts) the received uplink radio signal to a baseband signal, and outputs the baseband signal to the modulation and demodulation unit 107.

The modulation and demodulation unit 107 performs demodulation and decoding processes for the input baseband signal. In this way, data included in the uplink radio signal transmitted from the serving radio terminal UE2-1 and the serving radio terminal UE2-2 is obtained. The data is output to the control unit 102.

Furthermore, the modulation and demodulation unit 107 performs encoding and modulation of data from the control unit 102, thereby obtaining a baseband signal. The radio communication unit 106 converts (up-converts) the baseband signal to a downlink radio signal. Moreover, the modulation and demodulation unit 107 transmits the downlink radio signal through the antenna 108A to the antenna 108D.

The SRS transmission frequency band setting unit 112 of the control unit 102 sets, to each serving radio terminal UE2-1 and the serving radio terminal UE2-2, a frequency band (SRS transmission frequency band) that is used when the serving radio terminal UE2-1 and the serving radio terminal UE2-2 transmit a sounding reference signal (SRS) at a timing of a predetermined special subframe. Furthermore, the SRS is a signal to be referred to in the calculation of an antenna weight in the radio base station eNB1-1, and is an uplink radio signal of a radio frequency band.

The SRS transmission frequency band setting unit 112 sets a parameter corresponding to the bandwidth of the set SRS transmission frequency band, to SoundingRS-UL-Config, that is, the information element of the RRC Connection Reconfiguration message. Furthermore, the SRS transmission frequency band setting unit 112 sets the information on the center frequency of the set SRS transmission frequency band in the RRC Connection Reconfiguration message.

In addition, the SRS transmission frequency band setting unit 112 outputs to the modulation and demodulation unit 107, the RRC Connection Reconfiguration message of each serving radio terminal UE2-1 and the serving radio terminal UE2-2, in which the parameter as well as the information on the center frequency of the SRS transmission frequency band (hereinafter, these are appropriately referred to as "SRS transmission frequency band information") is set, at the timing of the subframe 311 of the downlink resource block illustrated in FIG. 3.

The modulation and demodulation unit 107 performs encoding and modulation of the RRC Connection Reconfiguration message to obtain a baseband signal. The radio communication unit 106 converts the baseband signal to a downlink radio signal, and transmits the downlink radio signal to the serving radio terminal UE2-1 and the serving radio terminal UE2-2, through the antenna 108A to the antenna 108D.

When the radio base station eNB1-1 transmits a downlink radio signal corresponding to the RRC Connection Reconfiguration message in which the SRS transmission frequency band information is set, the serving radio terminal UE2-1 and the serving radio terminal UE2-2 receive the downlink radio signal.

Moreover, the serving radio terminal UE2-1 and the serving radio terminal UE2-2 recognize the bandwidth of the SRS transmission frequency band based on the parameter set in the RRC Connection Reconfiguration message, and the parameter defined statically in correspondence to the cell 3-1. Furthermore, the serving radio terminal UE2-1 and the serving radio terminal UE2-2 recognize the center frequency of the SRS transmission frequency band based on the information on the center frequency of the SRS transmission frequency band that is set in the RRC Connection Reconfiguration message.

In addition, the serving radio terminal UE2-1 and the serving radio terminal UE2-2 transmit the SRS using the recognized SRS transmission frequency band, at a timing of a special subframe in the frame that is two frames after the frame during the reception of the RRC Connection Reconfiguration message.

The radio communication unit 106 of the radio base station eNB1-1 receives the SRS that is transmitted from the serving radio terminal UE2-1 and the serving radio terminal UE2-2, through the antenna 108A to the antenna 108D. The radio communication unit 106 receives the SRS from the serving radio terminal UE2-1 and the SRS from the serving radio terminal UE2-2 at the timing of the same special subframe. In addition, the radio communication unit 106 converts the received SRS to a baseband signal, and outputs the signal to the modulation and demodulation unit 107. Furthermore, the radio communication unit 106 outputs the information on the frequency band of the received SRS to the control unit 102. The modulation and demodulation unit 107 performs demodulation and decoding processes for the input baseband signal. In this way, the data included in the SRS transmitted by the serving radio terminal UE2-1 and the serving radio terminal UE2-2 is obtained. The data is output to the control unit 102.

The SRS transmission frequency band setting unit 112 determines if the frequency band of the SRS from the serving radio terminal UE2-1 and the frequency band of the SRS from the serving radio terminal UE2-2, which are received at the timing of the same special subframe, are the same.

As described above, the SRS transmission frequency band setting unit 112 sets, to the serving radio terminal UE2-1 and the serving radio terminal UE2-2, the transmission frequency band of the SRS. Therefore, the SRS transmission frequency band setting unit 112 can set, to the serving radio terminal UE2-1 and the serving radio terminal UE2-2, the transmission frequency band of the SRS, such that an SRS of different frequency bands is transmitted at the timing of the same special subframe. However, there is a possibility that the serving radio terminal UE2-1 and the serving radio terminal UE2-2 transmit an SRS of the same frequency at the timing of the same special subframe. In such a case, the SRS transmission frequency band setting unit 112 determines that the frequency band of the SRS from the serving radio terminal UE2-1 and the frequency band of the SRS from the serving radio terminal UE2-2, which are received at the timing of the same special subframe, are the same.

The SRS transmission frequency band setting unit 112 may be configured to determine if the frequency band of the SRS from the serving radio terminal UE2-1 and the frequency band of the SRS from the serving radio terminal UE2-2, which are received at the timing of the same special subframe, are the same only when the SRS transmission frequency band setting unit 112 receives the SRS from the radio terminal UE2-3 and the radio terminal UE2-4 that are subordinate to the radio base station eNB1-2.

If the frequency band of the SRS from the serving radio terminal UE2-1 and the frequency band of the SRS from the serving radio terminal UE2-2, which are received at the timing of the same special subframe, are the same, the SRS transmission frequency band setting unit 112 generates transmission stop request information, which is information requesting the stop of the transmission of SRS at the timing of the special subframe, for one of the serving radio terminals UE having a lower priority order (hereinafter, called the "PF priority order") of assignment of a downlink resource block, by a PF (Proportional Fair) scheme, of the serving radio terminal UE2-1 and the serving radio terminal UE2-2, or for one of the serving radio terminals UE for which it is determined that a downlink resource block need not be assigned based on the PF priority order.

Moreover, the SRS transmission frequency band setting unit 112 sets the transmission stop request information, to SoundingRS-UL-Config, that is, the information element of the RRC Connection Reconfiguration message.

In addition, the SRS transmission frequency band setting unit 112 outputs to the modulation and demodulation unit 107, the RRC Connection Reconfiguration message in which the transmission stop request information is set, at the timing of the subframe 311 of the downlink resource block illustrated in FIG. 3.

The modulation and demodulation unit 107 performs encoding and modulation of the RRC Connection Reconfiguration message to obtain a baseband signal. The radio communication unit 106 converts the baseband signal to a downlink radio signal, and transmits, via the antennas 108A to 108D, the downlink radio signal to one of the serving radio terminals UE having a lower PF priority order, or to one of the serving radio terminals UE for which it is determined that a downlink resource block need not be assigned based on the PF priority order (hereinafter, these are appropriately referred to as "Serving radio terminal UE for which the transmission is to be stopped").

On the other hand, the transmission of the downlink radio signal corresponding to the RRC Connection Reconfiguration message, in which the SRS transmission frequency band information is set, continues for the serving radio terminals other than the serving radio terminal for which the transmission is to be stopped.

When the radio base station eNB1-1 transmits a downlink radio signal corresponding to the RRC Connection Reconfiguration message in which the transmission stop request information is set, the serving radio terminal UE for which the transmission is to be stopped receives the downlink radio signal.

Moreover, the serving radio terminal UE for which the transmission is to be stopped stops the transmission of the SRS based on the transmission stop request information set in the RRC Connection Reconfiguration message.

As a result of execution of the aforementioned process concerning the transmission stop of the SRS, if the radio terminal UE2-1 and the radio terminal UE2-2, which are subordinate to the radio base station eNB1-1 and which are the serving radio terminals when the radio base station eNB1-1 is set as the reference, transmit SRS of the same frequency band at the timing of one special subframe, only one of the radio terminal UE2-1 and the radio terminal UE2-2 continues the transmission of the SRS, and the other stops the transmission of the SRS.

Furthermore, as a result of execution of the aforementioned process concerning the transmission stop of the SRS in the radio base station eNB1-2 as well, if the radio terminal UE2-3 and the radio terminal UE2-4, which are subordinate to the radio base station eNB1-2 and which are the serving radio terminals when the radio base station eNB1-2 is set as the reference, transmit SRS of the same frequency band at the timing of one special subframe, only one of the radio terminal UE2-3 and the radio terminal UE2-4 continues the transmission of the SRS, and the other stops the transmission of the SRS.

The RB assignment unit 114 assigns a downlink resource block to the serving radio terminal UE2-1 and the serving radio terminal UE2-2. Specifically, the RB assignment unit 114 assigns to the serving radio terminal UE2-1, the downlink resource block included in the frequency band of the SRS received most recently from the serving radio terminal UE2-1. Similarly, the RB assignment unit 114 assigns to the serving radio terminal UE2-2, the downlink resource block included in the frequency band of the SRS received most recently from the serving radio terminal UE2-2.

However, if the frequency band of the SRS received most recently from the serving radio terminal UE2-1 and the frequency band of the SRS received most recently from the serving radio terminal UE2-2 are the same, the RB assignment unit 114 does not assign a downlink resource block to one of the serving radio terminals UE having a lower PF priority order, or to one of the serving radio terminals UE for which it is determined that a downlink resource block need not be assigned based on the PF priority order. Next, the RB assignment unit 114 selects the next special subframe of the special subframes corresponding to the reception timing of the most recent SRS. Moreover, the RB assignment unit 114 determines the time period of the subframe that is two subframes before the selected special subframe as the time period of the downlink resource block to be assigned.

In addition, the RB assignment unit 114 generates a downlink RB assignment value that can uniquely identify a frequency band and a time period of the determined downlink resource block. The downlink RB assignment value is obtained by a process of a medium access control (MAC) layer. The downlink RB assignment value includes a resource block number indicating the information for uniquely identifying a time period and a frequency band of the downlink resource block to be assigned to the serving radio terminal UE.

The RB assignment unit 114 transmits the downlink RB assignment value to the serving radio terminal UE through the modulation and demodulation unit 107, the radio communication unit 106, and the antenna 108A to the antenna 108D.

FIG. 6 is a diagram illustrating an example of the correspondence between the frequency band of SRS and the assigned downlink resource block.

The RB assignment unit 114 receives SRS of the frequency band 1 from each of the serving radio terminal UE2-1 and the serving radio terminal UE2-2, at the timing of the special subframe 301. Then, the RB assignment unit 114 assigns the downlink resource block included in the frequency band 1 to one of the serving radio terminals UE having a higher PF priority order, or to one of the serving radio terminals UE (that is, the serving radio terminal UE2-1 in the present case) for which it is determined that a downlink resource block needs to be assigned based on the PF priority order, at the timing of the subframe 302 that is two subframes before the next special subframe 303.

After the downlink resource block has been assigned by the RB assignment unit 114, the antenna weight calculation unit 116 calculates the antenna weight (a transmission weight) during the transmission of the downlink radio signal using the assigned downlink resource block, for each antenna 108A to the antenna 108D.

Specifically, the antenna weight calculation unit 116 identifies the frequency band of a downlink resource block assigned to one of the serving radio terminal UE2-1 and the serving radio terminal UE2-2, based on the downlink RB assignment value generated by the RB assignment unit 114.

Next, the antenna weight calculation unit 116 calculates the transmission weight for the frequency band of the downlink resource block assigned to one of the serving radio terminal UE2-1 and the serving radio terminal UE2-2, based on the SRS received most recently from one of the serving radio terminal UE2-1 and the serving radio terminal UE2-2, and the SRS received most recently from one of the non-serving radio terminal UE2-3 and the non-serving radio terminal UE2-4.

The antenna weight calculation unit 116 calculates, as the transmission weight, the antenna weight when a desired wave direction of a beam is directed towards one of the serving radio terminal UE2-1 and the serving radio terminal UE2-2 that transmit the SRS, and a null direction of the beam is directed towards one of the non-serving radio terminal UE2-3 and the non-serving radio terminal UE2-4 that transmit the SRS.

Following that, the control unit 102 transmits the downlink radio signal to the serving radio terminal UE2-1 and the serving radio terminal UE2-2, through the modulation and demodulation unit 107, the radio communication unit 106, and the antenna 108A to the antenna 108D, by using the assigned downlink resource block.

Furthermore, the aforementioned process concerning the calculation of the transmission weight is performed in the radio base station eNB1-2 as well.

(3) Operation of Radio Base Station

FIG. 7 is a flowchart illustrating an operation of the radio base station eNB1-1.

In step S101, the SRS transmission frequency band setting unit 112 of the radio base station eNB1-1 receives SRS from the serving radio terminal UE2-1 and the serving radio terminal UE2-2, at the timing of a predetermined special subframe.

In step S102, the SRS transmission frequency band setting unit 112 determines if the frequency band of the SRS from the serving radio terminal UE2-1 and the frequency band of the SRS from the serving radio terminal UE2-2 are the same.

If the frequency band of the SRS from the serving radio terminal UE2-1 and the frequency band of the SRS from the serving radio terminal UE2-2 are the same, then in step S103, the SRS transmission frequency band setting unit 112 transmits, to one of the serving radio terminal UE2-1 and the serving radio terminal UE2-2, an RRC Connection Reconfiguration message in which the SRS transmission frequency band information is set, and transmits, to the other one of the serving radio terminal UE2-1 and the serving radio terminal UE2-2, an RRC Connection Reconfiguration message in which the transmission stop request information is set.

(4) Operation and Effect

As described above, according to the present embodiment, if the frequency band of the SRS from the serving radio terminal UE2-1 and the frequency band of the SRS from the serving radio terminal UE2-2, which are received at the timing of the same special subframe, are the same, the radio base station eNB1-1 transmits, to one of the serving radio terminal UE2-1 and the serving radio terminal UE2-2, an RRC Connection Reconfiguration message in which the transmission stop request information is set.

Upon receiving the RRC Connection Reconfiguration message in which the transmission stop request information is set, the serving radio terminal UE stops the transmission of the SRS according to the request.

Therefore, there remains only one serving radio terminal UE that transmits SRS of a predetermined frequency band at a predetermined timing. As a result, the simultaneous transmission of an SRS of the same frequency band by both the serving radio terminal UE2-1 and the serving radio terminal UE2-2 is prevented. Also, at the time of calculating the antenna weight for a downlink radio resource used in the radio communication between the serving radio terminal UE2-3 and the serving radio terminal UE2-4 that are subordinate to another radio base station eNB1-2, the other radio base station eNB1-2 can determine the direction of placing null, and can thus perform appropriate null steering.

Furthermore, in the present embodiment, the radio base station eNB1-1 transmits an RRC Connection Reconfiguration message in which the transmission stop request information is set, to one of the serving radio terminals UE having a lower PF priority order, or to one of the serving radio terminals UE for which it is determined that a downlink resource block need not be assigned based on the PF priority order, from among the serving radio terminal UE2-1 and the serving radio terminal UE2-2. Due to the fact that a serving radio terminal UE for which the transmission of the SRS must be stopped is set based on the PF priority order, the occurrence of the problem that in the subsequent assignment of the downlink resource block, the downlink resource block is not assigned to the serving radio terminal UE having a higher PF priority order, or to one of the serving radio terminals UE for which it is determined that a downlink resource block needs to be assigned based on the PF priority order, can be prevented because the SRS is not transmitted from the serving radio terminal UE.

(5) Other Embodiments

As described above, the present invention has been described with the embodiments. However, it should not be understood that those descriptions and drawings constituting a part of the present disclosure limit the present invention. Further, various substitutions, examples, or operational techniques shall be apparent to a person skilled in the art on the basis of this disclosure.

In the aforementioned embodiment, a case in which two radio terminals UE, that is, the radio terminal UE2-1 and the radio terminal UE2-2 exist subordinate to the radio base station eNB1-1, was explained, however, the present invention can be applied similarly to a case in which three or more radio terminals UE exist. In such a case, the SRS transmission frequency band setting unit 112 performs the process of transmitting an RRC Connection Reconfiguration message, in which the transmission stop request information is set, to the serving radio terminals other than the serving radio terminal UE having the highest PF priority order, or to the serving radio terminals UE other than the one serving radio terminal for which it is determined that a downlink resource block needs to be assigned based on the PF priority order.

In the aforementioned embodiments, the timing of the special subframe was used as the transmission timing of SRS in the serving radio terminal UE2-1. However, the transmission timing of the SRS is not limited thereto, and it is sufficient if the transmission timing is a timing agreed in advance between the radio base station eNB1-1 and the serving radio terminal UE2. However, it is preferable that the transmission timing of the SRS exists once in a time of at least one frame.

Furthermore, in the aforementioned embodiments, the radio base station eNB1-1 used the reception weight as the transmission weight. However, the transmission weight may be calculated independently of the reception weight.

In the aforementioned embodiments, the TDD-LTE radio communication system was described. However, the present invention can be applied in the same manner to all types of radio communication systems in which asymmetric radio communication in which a frequency band of an uplink radio signal to be assigned to a radio terminal is different from a frequency band of a downlink radio signal is employed. Thus, it must be understood that the present invention includes various embodiments that are not described herein. Therefore, the present invention is limited only by the specific features of the invention in the scope of the claims reasonably evident from the disclosure above.

In addition, the entire content of Japanese Patent Application No. 2010-191354 (filed on Aug. 27, 2010) is incorporated in the present specification by reference.

INDUSTRIAL APPLICABILITY

According to the present embodiment, it is possible to provide a radio base station and a radio control method by which it is possible to perform an appropriate null steering in another radio base station.

The invention claimed is:

1. A radio base station of an adaptive array radio scheme applying an antenna weight to a plurality of antennas, comprising:
    a transmission unit that transmits reference signal transmission frequency band control information, to a serving radio terminal, for controlling a reference signal transmission frequency band available in a transmission of a reference signal from the serving radio terminal, the reference signal being referenced in a calculation of the antenna weight, wherein
    in case that one serving radio terminal included in a plurality of serving radio terminals transmits a reference signal of a first reference signal transmission frequency band at a predetermined timing, the transmission unit transmits transmission stop request information indicating a request to stop the transmission of the reference signal of the first reference signal transmission frequency band at the predetermined timing, to another serving radio terminal in response to the radio base station receiving a reference signal from a non-serving radio terminal communicating with another radio base station.

2. The radio base station according to claim 1, wherein the transmission unit transmits the transmission stop request information to a serving radio terminal other than one serving radio terminal having a highest priority order of assignment of a radio resource, from among a plurality of serving radio terminals.

3. The radio base station according to claim 1, wherein the transmission unit transmits the transmission stop request information to a serving radio terminal for which an assignment of a radio resource is not necessary, from among a plurality of serving radio terminals.

4. The radio base station according to claim 1, wherein the transmission unit transmits the transmission stop request information when it is determined that the plurality of serving radio terminals transmit a reference signal of the first reference signal transmission frequency band at the predetermined timing and when the one serving radio terminal is allowed to continue the transmission of the reference signal of the first reference signal transmission frequency band at the predetermined timing.

5. The radio base station according to claim 1, wherein the transmission unit transmits the transmission stop request information to the another serving terminal determined on a basis of priority order of assignment of a downlink resource block.

6. The radio base station according to claim 1, comprising: a control unit that calculates the antenna weight of a downlink resource block assigned to the one serving radio terminal not stopping a transmission of the radio reference signal, based on the radio reference signal from the one serving radio terminal and the reference signal from the non-serving radio terminal.

7. The radio base station according to claim 6, wherein the control unit calculates the antenna weight when a desired wave direction of a beam is directed towards the one serving radio terminal not stopping the transmission of the radio reference signal and a null direction of the beam is directed towards the non-serving radio terminal transmitting the reference signal.

8. A communication control method in a radio base station of an adaptive array radio scheme applying an antenna weight to a plurality of antennas, comprising:
- a step of transmitting reference signal transmission frequency band control information, to a serving radio terminal, for controlling a reference signal transmission frequency band available in a transmission of a reference signal from the serving radio terminal, the reference signal being referenced in a calculation of the antenna weight, wherein
- in case that one serving radio terminal included in a plurality of serving radio terminals transmits a reference signal of a first reference signal transmission frequency band at a predetermined timing, the step of transmitting includes a step of transmitting transmission stop request information indicating a request to stop the transmission of the reference signal of the first reference signal transmission frequency band at the predetermined timing, to another serving radio terminal in response to the radio base station receiving a reference signal from a non-serving radio terminal communicating with another radio base station.

* * * * *